United States Patent
Karachevtsev et al.

(10) Patent No.: US 11,228,676 B1
(45) Date of Patent: Jan. 18, 2022

(54) SYSTEM AND METHOD FOR PROVIDING TELEPHONE EVENT DATA

(71) Applicant: The Fifth Lab Inc., Concord (CA)

(72) Inventors: Sergiy Karachevtsev, Kyiv (UA); Vyacheslav Furyst, Yurivka (UA)

(73) Assignee: The Fifth Lab Inc., Concord (CA)

( * ) Notice: Subject to any disclaimer, the term of this patent is extended or adjusted under 35 U.S.C. 154(b) by 0 days.

(21) Appl. No.: 17/088,703

(22) Filed: Nov. 4, 2020

(51) Int. Cl.
| H04M 15/00 | (2006.01) |
| H04M 3/24 | (2006.01) |
| H04M 3/22 | (2006.01) |
| G06F 9/54 | (2006.01) |

(52) U.S. Cl.
CPC ............ *H04M 3/242* (2013.01); *G06F 9/541* (2013.01); *G06F 9/543* (2013.01); *H04M 3/2218* (2013.01)

(58) Field of Classification Search
None
See application file for complete search history.

(56) References Cited

U.S. PATENT DOCUMENTS

| 6,134,308 A * | 10/2000 | Fallon ................... H04M 1/575 379/142.06 |
| 6,185,194 B1 | 2/2001 | Musk et al. |
| 6,882,714 B2 * | 4/2005 | Mansfield ............. H04M 15/53 379/142.14 |
| 7,197,123 B1 * | 3/2007 | Gilbert .................... H04M 1/57 379/142.01 |
| 8,472,987 B2 | 6/2013 | Bhatnagar |
| 9,178,988 B2 * | 11/2015 | Azim ................... H04M 3/2218 |
| 9,509,819 B2 | 11/2016 | Wildeman et al. |
| 2002/0122546 A1 | 9/2002 | Brogne et al. |
| 2003/0112948 A1 | 6/2003 | Brown et al. |
| 2005/0032527 A1* | 2/2005 | Sheha .................... H04M 1/575 455/456.1 |
| 2009/0068979 A1* | 3/2009 | Alston ................ H04M 7/0036 455/405 |
| 2010/0226362 A1 | 9/2010 | Kim et al. |
| 2017/0126883 A1* | 5/2017 | Rodriguez .............. H04L 51/36 |

* cited by examiner

*Primary Examiner* — Quoc D Tran
(74) *Attorney, Agent, or Firm* — Rowand LLP

(57) ABSTRACT

A system and method for providing telephone event data are described. The system comprises a communications module; a processor coupled to the communications module; and a memory coupled to the processor, the memory storing processor-executable instructions which, when executed by the processor, configure the processor to receive, via the communications module and from a telco server, telephone event data; translate at least a portion of the telephone event data into a format compliant with a particular application executing on a computing device; and send, via the communications module and to the computing device executing the particular application, the translated portion of the telephone event data.

18 Claims, 8 Drawing Sheets

US 11,228,676 B1

SYSTEM AND METHOD FOR PROVIDING TELEPHONE EVENT DATA

TECHNICAL FIELD

The present disclosure relates to systems and methods for providing telephone event data.

BACKGROUND

Business applications such as customer relationship management applications allow a company to manage and analyze its own interactions with its past, current and potential customers. Such business applications use data analysis about customers' history with a company to improve business relationships with customers, specifically focusing on customer retention and sales growth.

The data analysis performed by such business applications is based on various types of data. One such type of data is telephone event data. Telephone event data may include data relating to telephone call events, telephone call logs, telephone conversation recordings, telephone voicemail recordings, short message service messages, telephone location data, etc.

Telephone event data may be stored on a mobile device executing the business application. For example, a call log may be stored in memory of a mobile device or may be stored in cloud storage and retrieved using the mobile device. This telephone event data may be deleted or removed by the user and thus may not be available to an administrator of the business application.

In some scenarios, a user may wish to execute a telephone call on a feature phone, that is, a mobile device that does not have the capability to download and store business applications. The user may have access to a business application executing on a computing device, however, to store telephone event data within the business application, the user would have to enter their own telephone event data into the business application using the computing device. This is prone to errors and is unreliable.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
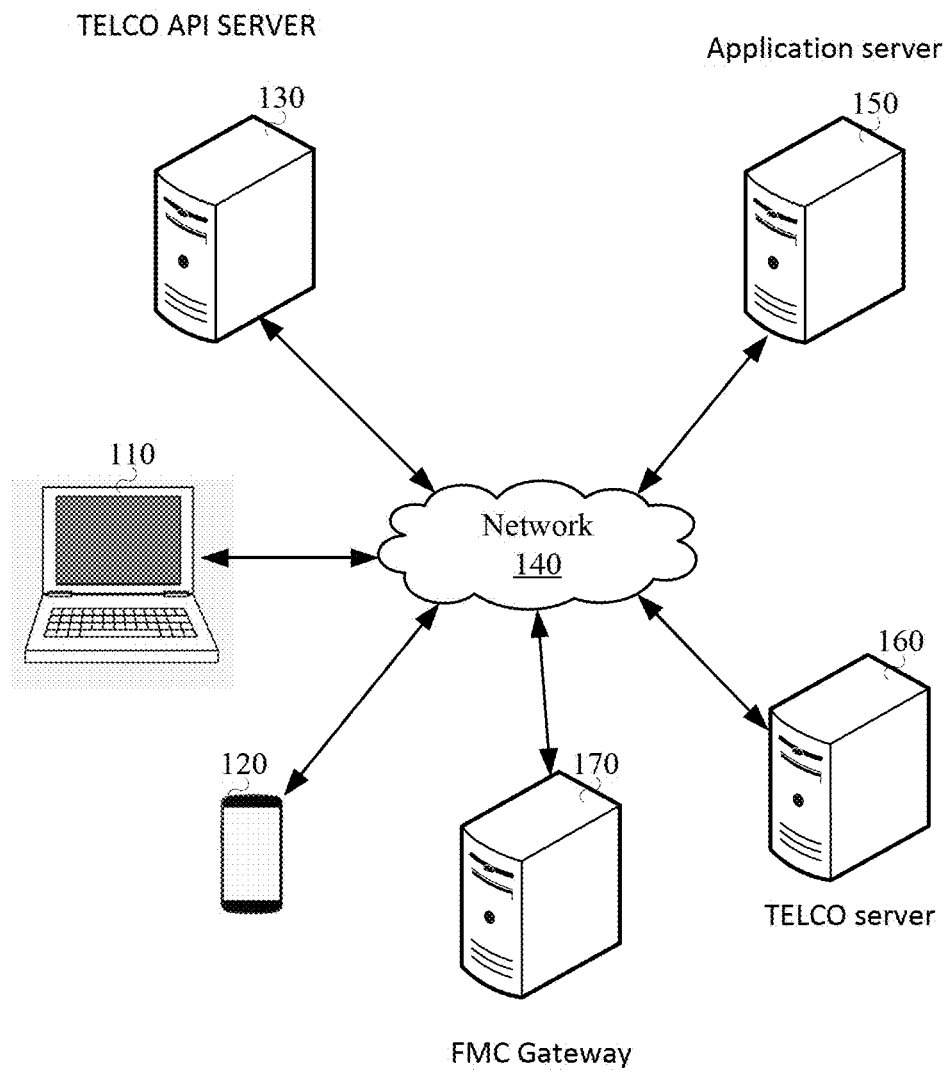
FIG. 1 is a schematic operation diagram illustrating an operating environment of an example embodiment.

Accordingly, in one aspect there is provided a system comprising a communications module; a processor coupled to the communications module; and a memory coupled to the processor, the memory storing processor-executable instructions which, when executed by the processor, configure the processor to receive, via the communications module and from a telco server, telephone event data; translate at least a portion of the telephone event data into a format compliant with a particular application executing on a computing device; and send, via the communications module and to the computing device executing the particular application, the translated portion of the telephone event data.

In one or more embodiments, translating at least a portion of the telephone event data comprises identifying, based on a phone number associated with the received telephone event data, the particular application; obtaining a plug-in associated with the particular application from a plug-in library; and translating the at least the portion of the telephone event data using the obtained plug-in.

In one or more embodiments, prior to sending the translated portion of the telephone event data, the processor-executable instructions, when executed by the processor, configure the processor to receive, via the communications module and from the computing device executing the particular application, a request for the telephone event data.

In one or more embodiments, the request for the telephone event data is received from the computing device executing the particular application periodically.

In one or more embodiments, the translated portion of the telephone event data is sent to the computing device executing the particular application periodically or in real-time.

In one or more embodiments, the processor-executable instructions, when executed by the processor, further configure the processor to determine that the particular application does not have memory storage for the translated portion of the telephone event data; when it is determined that the particular application does not have memory storage for the telephone event data, associate the translated portion of the telephone event data with a telephone event data identification; store the translated portion of the telephone event data in the memory in association with the telephone event data identification; and send, via the communications module and to the computing device executing the particular application, the telephone event data identification.

In one or more embodiments, the processor-executable instructions, when executed by the processor, further configure the processor to receive, via the communications module and from the computing device executing the particular application, a request for the translated portion of the telephone event data, the request including the telephone event data identification; retrieve the stored translated portion of the telephone event data based on the telephone event data identification; and send, via the communications module and to the computing device executing the particular application, the translated portion of the telephone event data.

In one or more embodiments, the processor-executable instructions, when executed by the processor, further configure the processor to receive, via the communications module and from an administrator computing device, configuration data identifying a telephone number and the particular application.

In one or more embodiments, the processor-executable instructions, when executed by the processor, further configure the processor to select the portion of the telephone event data to be translated based on the particular application.

In one or more embodiments, the telephone event data includes at least one of telephone call events, telephone call logs, telephone conversation recordings, telephone voicemail recordings, short message service messages or telephone location data.

In one or more embodiments, the processor-executable instructions, when executed by the processor, further configure the processor to receive, via the communications module and from the computing device executing the particular application, a call initiation command; sending, via the communications module and to the telco server, a signal to initiate a call based on the call initiation command.

According to another aspect there is provided a computer-implemented method comprising receiving, via a communications module and from a telco server, telephone event data; translating at least a portion of the telephone event data into a format compliant with a particular application executing on a computing device; and sending, via the communications module and to the computing device executing the particular application, the translated portion of the telephone event data.

In one or more embodiments, translating at least a portion of the telephone event data comprises identifying, based on a phone number associated with the received telephone event data, the particular application; obtaining a plug-in associated with the particular application from a plug-in library; and translating the at least the portion of the telephone event data using the obtained plug-in.

In one or more embodiments, the method further comprises receiving, via the communications module and from the computing device executing the particular application, a request for the telephone event data.

In one or more embodiments, the request for the telephone event data is received from the computing device executing the particular application periodically or in real-time.

In one or more embodiments, the method further comprises periodically sending the translated portion of the telephone event data to the computing device executing the particular application.

In one or more embodiments, the method further comprises determining that the particular application does not have memory storage for the translated portion of the telephone event data; when it is determined that the particular application does not have memory storage for the telephone event data, associating the translated portion of the telephone event data with a telephone event data identification; storing the translated portion of the telephone event data in the memory in association with the telephone event data identification; and sending, via the communications module and to the computing device executing the particular application, the telephone event data identification.

In one or more embodiments, the method further comprises receiving, via the communications module and from the computing device executing the particular application, a request for the translated portion of the telephone event data, the request including the telephone event data identification; retrieving the stored translated portion of the telephone event data based on the telephone event data identification; and sending, via the communications module and to the computing device executing the particular application, the translated portion of the telephone event data.

In one or more embodiments, the method further comprises selecting the portion of the telephone event data to be translated based on the particular application.

According to another aspect there is provided a non-transitory computer-readable storage medium storing instructions that, when executed by a processor of a computer system cause the computer system to receive, via a communications module and from a telco server, telephone event data; translate at least a portion of the telephone event data into a format compliant with a particular application executing on a computing device; and send, via the communications module and to the computing device executing the particular application, the translated portion of the telephone event data Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment. FIG. 1 illustrates a system 100 for providing telephone data.

As shown, a computing device 110, a mobile device 120 and a server 130 communicate via a network 140. The computing device 110 and the mobile device 120 may be associated with a user.

The server 130 may be referred to as telecommunications (TELCO) application programming interface (API) server 130. As will be described in more detail below, the TELCO API server 130 may be configured to provide telephone event data to the computing device 110 and/or may be configured to store the telephone event data and associate the telephone event data with a telephone event data identification.

The system 100 includes at least one application server 150. The application server 150 may be associated with a third-party application (such as a web or mobile application) that is resident on the computing device 110 and/or the mobile device 120. For example, the application server 150 may connect the computing device 110 to a back-end system associated with the third-party application. The third-party application may be a business application such as for example a customer relationship management (CRM) application. When the third-party application is resident on the computing device 110, the application server 150 is connected to the computing device 110 and the TELCO API server 130 via the network 140. When the third-party application is resident on the mobile device 120, the application server 150 is connected to the mobile device 120 and the TELCO API server 130 via the network 140. When third-party application is resident on the computing device 110 and the mobile device 120, the application server 150 is connected to the computing device 110, the mobile device 120, and the TELCO API server 130 via the network 140.

The system 100 also includes at least one telecommunications (TELCO) server 160. The TELCO server 160 may be associated with one or more telecommunication networks such as for example public switched telephone network (PSTN), public land mobile network (PLMN), and Voice-over-LTE (VoLTE). The TELCO server 160 may include one or more data centers configured to deploy and manage a mobile phone network. The mobile device 120 may be connected to the one or more telecommunication networks associated with the TELCO server 160.

The system 100 also includes a fixed-mobile convergence (FMC) gateway 170. The FMC gateway 170 may be connected to the TELCO API server 130 and/or the TELCO server 160 via the network 140. The FMC gateway 170 may be configured to initiate and control telephone calls to and from the mobile device 120, as will be described in more detail below. The FMC gateway may be configured to operate with various telephone networks such as for example PSTN, PLMN, VoLTE, etc.

As will be described in more detail below, the TELCO API server 130 may be configured to receive telephone event data from the TELCO server 160 in a TELCO generated format. For example, the TELCO API server 130 may be configured to receive telephone event data based on a particular phone number or group of phone numbers associated with the one or more telecommunication networks of which the TELCO server 160 is associated. The TELCO API server 130 may also be configured to initiate/terminate call events when requested from the computing device 110. The call events may include telephone calls made or received by the mobile device 120.

The computing device 110, the mobile device 120, the TELCO API server 130, the application server 150 and the TELCO server 160 may be in geographically disparate locations. Put differently, the computing device 110, the mobile device 120, the TELCO API server 130, the application server 150 and the TELCO server 160 may be remote from one another.

The computing device 110, the TELCO API server 130, the application server 150 and the TELCO server 160 are computer systems. The computing device 110 may take a variety of forms including, for example, a laptop or desktop computer, a cloud computing device, a virtual computing device or a computing device of another type.

The mobile device 120 may take a variety of forms including, for example, a mobile communication device such as a smartphone, a feature phone, or a telephone of another type. Where the mobile device 120 is a smartphone or feature phone, the mobile device 120 is a computer system.

In certain embodiments, a user may operate the computing device 110 to cause the computing device 110 and/or the mobile device 120 to perform one or more operations consistent with the disclosed embodiments. The computing device 110 and the mobile device 120 may be associated with the same user.

The network 140 is a computer network. In some embodiments, the network 140 may be an internetwork such as may be formed of one or more interconnected computer networks. For example, the network 140 may be or may include an Ethernet network, a wireless network, a cloud network, a telecommunications network or the like.

Operations associated with the TELCO API server 130 will be described in greater detail below.

Figure 2:
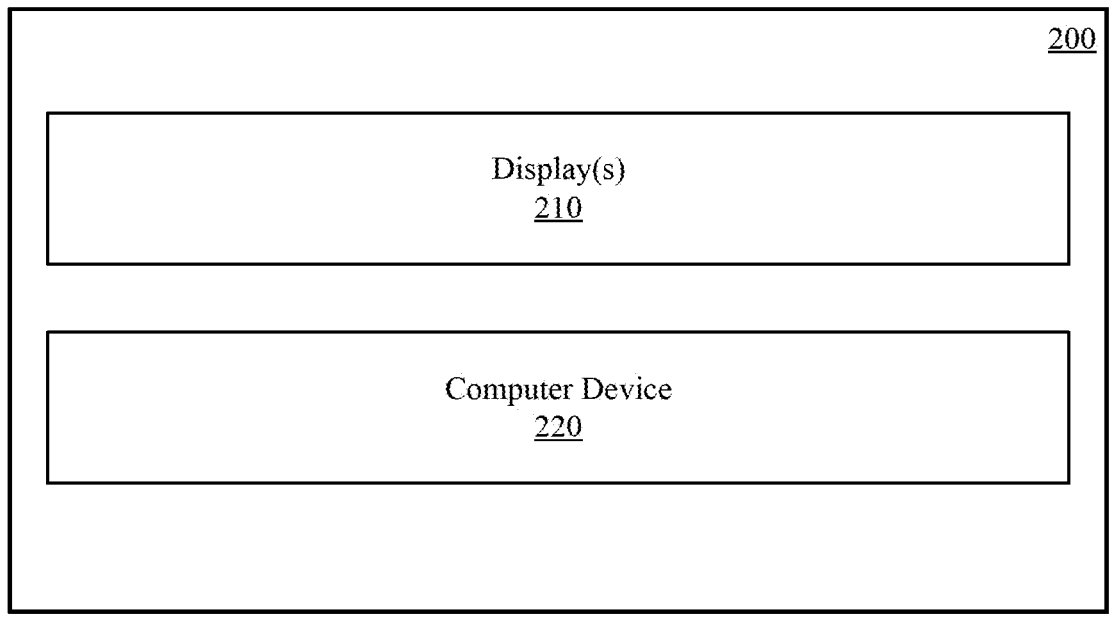
FIG. 2 is a simplified schematic diagram showing components of a computing device.

FIG. 2 is a simplified schematic diagram showing component of an exemplary computing device 200. The computing device 110 and/or the mobile device 120 may be of the same type as computing device 200. The computing device 200 may include modules such as for example one or more displays 210 and a computer device 220.

The one or more displays 210 are a display module. The one or more displays 210 may be used to display screens of a graphical user interface that may be used, for example, to communicate with the TELCO API server 130 and/or the application server 150 (FIG. 1). The one or more displays 210 may be internal displays of the computing device 200 (e.g., disposed within a body of the computing device) or may be external displays connected to the computing device 200.

The computer device 220 is in communication with the one or more displays 210. The computer device 220 may be or may include a processor which is coupled to the one or more displays 210.

Figure 3:
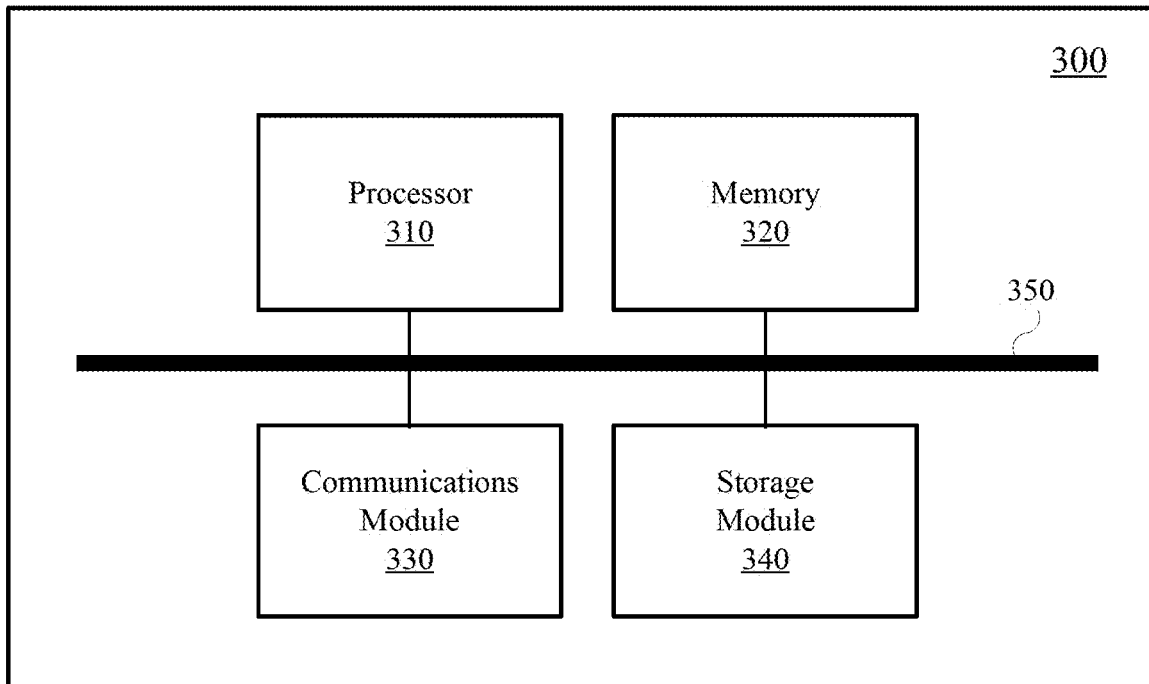
FIG. 3 is a high-level schematic diagram of an example computer device.

Referring now to FIG. 3, a high-level operation diagram of an example computer device 300 is shown. In some embodiments, the computer device 300 may be exemplary of the computer device 220 (FIG. 2), the TELCO API server 130, the application server 150 and/or the TELCO server 160.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350. One or more modules of the example computer device 300 may be part of a cloud system. For example, the memory 320 may include cloud storage memory that is accessible by the example computer device 300 over a network.

The processor 310 is a hardware processor. The processor 310 may, for example, be one or more ARM, Intel x86, PowerPC processors or the like. The processor may also be a cloud computing processor or virtual processor.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, public switched telephone network (PSTN), public land mobile network (PLMN), Voice-over-LTE (VoLTE), Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
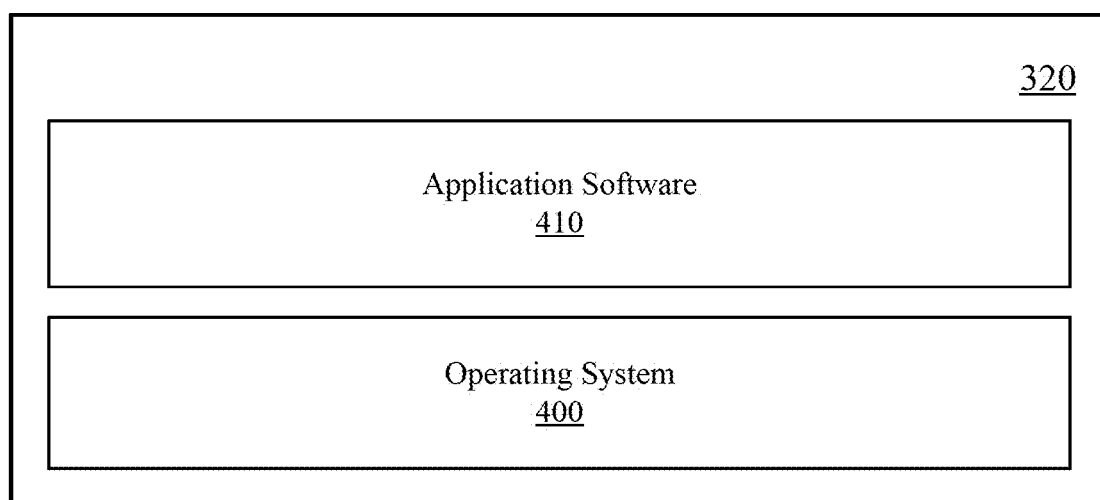
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computing device 240 (FIG. 2) of computing device 110 or mobile device 120 (FIG. 1), the TELCO API server 130, the application server 150 and/or the TELCO server 160.

While a single application 410 is illustrated in FIG. 3, in operation the memory 320 may include more than one application 410 and different applications 410 may perform different operations. For example, in at least some embodiments in which the computer device 300 is functioning as the computing device 110 and/or the mobile device 120, the applications 410 may include a business application. The business application may be a customer relationship management (CRM) application associated with a particular entity or business. The user of the computing device 110 and/or the mobile device 120 may be, for example, an employee of the particular entity or business. The business application may be configured for secure communications with the TELCO API server 130 and the application server 150. As will be described in more detail below, the business application may receive telephone event data based on telephone events performed via one or more communication networks associated with the TELCO server 160 via the TELCO API server 130.

By way of further example, in at least some embodiments in which the computer device 300 functions as the mobile device 120, the applications 410 may include an electronic instant messaging application. The electronic instant messaging application may be configured to exchange electronic instant messages within a chat interface with other computing devices.

Embodiments of operations performed by the TELCO API server 130 will now be described. Generally, the TELCO API server 130 is configured to act as an API between the TELCO server 160 and the application executing on the computing device 110 and/or the mobile device 120.

Specifically, the TELCO API server 130 is configured to obtain telephone event data from the TELCO server 160. Specifically, the TELCO API server 130 is configured to receive telephone event data based on a particular phone number (or group of phone numbers). The particular phone number is a phone number registered with or associated with the one or more telecommunication networks of which the TELCO server 160 is associated. Put another way, the particular phone number may be registered with the TELCO server 160 during a configuration process. The particular phone number may be a phone number registered with or associated with the mobile device 120.

Once registered, the TELCO server 160 communicates telephone events made by the mobile device 120 of which the particular phone number is registered to the TELCO API server 130. The telephone events include telephone call events, telephone call logs, telephone conversation recordings, telephone voicemail recordings, short message service messages, telephone location data, etc. The telephone events are communicated to the TELCO API server 130 in the form of telephone event data and in a TELCO generated format. The TELCO generated format of the telephone event data is not compatible with the format required by a particular application executing on the computing device 110. As such, the TELCO API server 130 is required to translate the telephone event data from a TELCO generated format to a format compliant with a particular application.

During the configuration process, the TELCO API server 130 may receive, via the communications module and from an administrator computing device, configuration data identifying the telephone number and a particular application. Put another way, during the configuration process, the particular phone number may be associated with a particular application executing on the computing device 110 and this may be used to translate the telephone event data into a format compliant with the particular application. The association of the particular phone number and the particular application executing on the computing device 110 may be stored in memory of the TELCO API server 130. For example, the association of the particular phone number and the particular application executing on the computing device 110 may be stored as a lookup table.

The TELCO API server 130 includes a plug-in library that comprises a number of plug-ins. Each plug-in is configured to translate data from the TELCO generated format to a particular format compatible with a particular application. Put another way, each plug-in is associated with a particular TELCO generated format and a format compliant with a particular application. Each plug-in may be generated utilizing one or more state machines associated with a particular application. The state machines may include one or more data inputs that are compatible with the particular application. Data extracted from the telephone event data received in the TELCO generate format may be used to map to the one or more state machines and the state machines may be configured to translate the telephone event data into the format compliant with the particular application.

In this manner, telephone events may be initiated, terminated, monitored, recorded, etc. regardless of the type of mobile device 120. For example, the mobile device 120 may be a feature phone and as such may not be able to download the particular application. As such, the application executing on the computing device 110 may receive telephone event data based on telephone events made using the mobile device 120 and, with the help of the TELCO API server 130, the telephone event data may be received from the TELCO server 160 rather than from the mobile device 120. Further, since the telephone event data is received from the TELCO server 160 via the TECLO API server 130, the telephone event data received by the particular application is reliable and less likely to contain errors.

Figure 5:
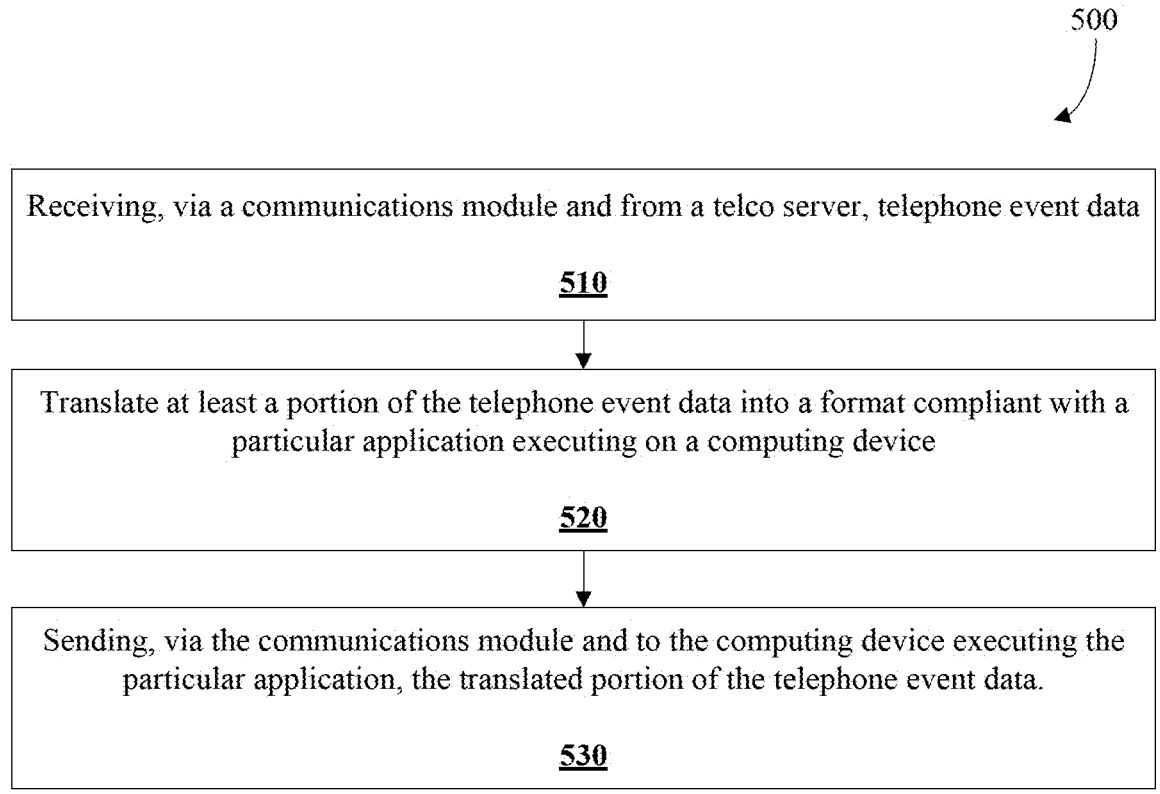
FIG. 5 is a flowchart showing operations performed by a server in providing telephone event data according to an embodiment.
Figure 6:
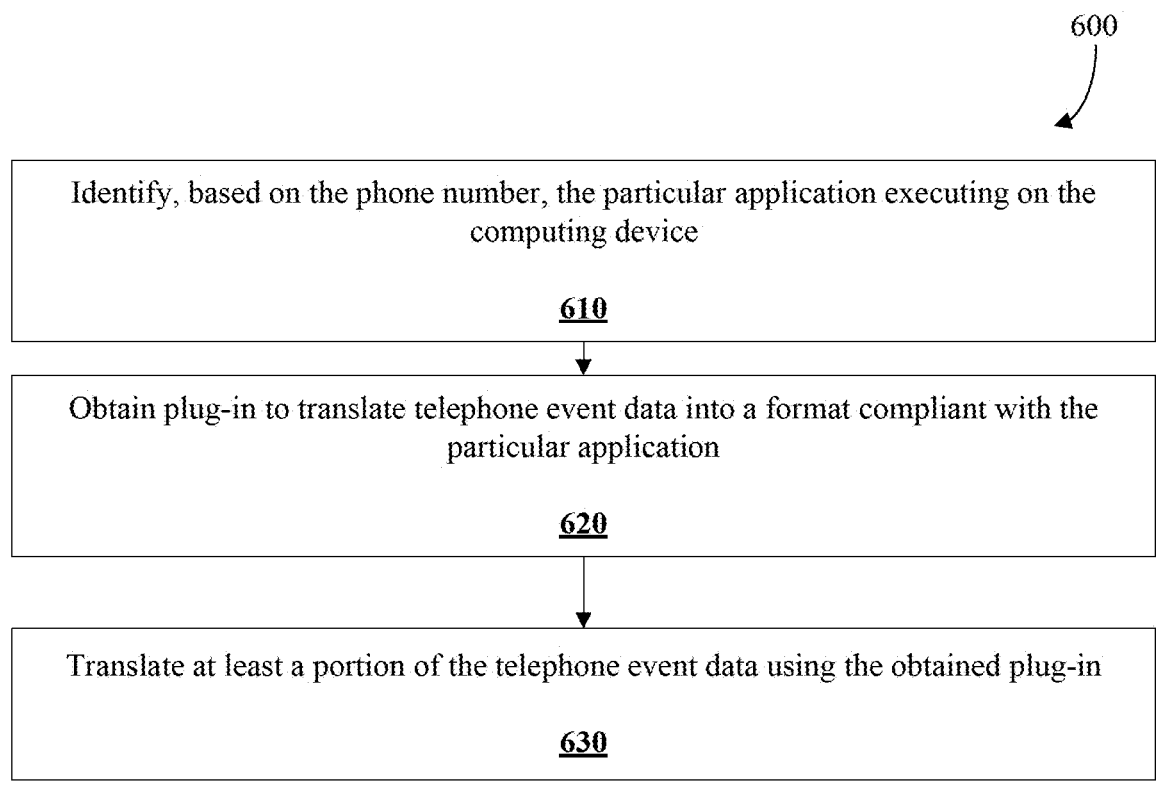
FIG. 6 is a flowchart showing operations performed by a server in translating a portion of telephone event data into a format compliant with a particular application according to an embodiment.

FIG. 5 is a flowchart showing operations performed by the TELCO API server 130 according to an embodiment. The operations may be included in a method 500 which may be performed by the TELCO API server 130. For example, computer-executable instructions stored in memory of the TELCO API server 130 may, when executed by a processor of the TELCO API server 130, configure the TELCO API server 130 to perform the method 500 or a portion thereof.

The TELCO API server 130 receives, via the communications module and from the TELCO server 160, telephone event data (step 510).

As mentioned, telephone event data may include data relating to telephone call events, telephone call logs, telephone conversation recordings, telephone voicemail recordings, short message service messages, telephone location data, etc. The telephone event data may be pushed by the TELCO server 160 or may be pulled by the TELCO API server 130. For example, the telephone event data may be pushed by the TELCO server 160 in a manner such that the telephone event data is received from the TELCO server 160 in real-time or near real-time. As another example, the telephone event data may be pushed periodically by the TELCO server 160 in a manner such that the telephone event data is received from the TELCO server 160 every minute, every thirty (30) minutes, every hour, every day, etc. As another example, the telephone event data may be pulled by the TELCO API server 130 in a manner such that the telephone event data is only received when requested by the TELCO API server 130.

The telephone event data is received from the TELCO server 160 in a TELCO generated format and includes identifying information such as for example a particular phone number associated with the telephone event data.

At least a portion of the telephone event data is translated into a format compliant with a particular application executing on a computing device (step 520).

In this embodiment, the TELCO API server 130 translates the portion of the telephone event data into the format compliant with the particular application executing on the computing device and this may be done according to operations performed by the TELCO API server 130. The operations may be included in a method 600 which may be performed by the TELCO API server 130. For example, computer-executable instructions stored in memory of the TELCO API server 130 may, when executed by a processor of the TELCO API server 130, configure the TELCO API server 130 to perform the method 600 or a portion thereof.

The TELCO API server 130 identifies, based on the phone number, the particular application executing on the computing device 110 (step 610). As mentioned, during the configuration process, the particular phone number may be associated with a particular application executing on the computing device 110. The TELCO API server 130 may perform a lookup to identify which application is associated with the phone number associated with the received telephone event data.

The TELCO API server 130 obtains a plug-in to translate the telephone event data from the TELCO generated format to a format compliant with the particular application (step 620). As mentioned, the TELCO API server 130 includes a plug-in library that comprises a number of plug-ins, each plug-in being associated with a particular TELCO generated format and a format compliant with a particular application. The TELCO API server 130 obtains the plug-in that matches the particular TELCO generated format and the format compliant with the particular application.

At least a portion of the telephone event data is translated into the format compliant with the particular application using the obtained plug-in (step 630). The telephone event data is sent as input to the obtained plug-in where at least a portion of the telephone event data is translated into the format compliant with the particular application. As will be appreciated, in some embodiments, some of the telephone event data received in the TELCO generated format may not be required by the particular application and as such only a portion of the telephone event data may be selected for translation.

Referring back to FIG. 5, the TELCO API server 130 sends, via the communications module and to the computing device executing the particular application, the translated portion of the telephone event data (step 530).

The translated portion of the telephone event data may be pushed by the TELCO API server 130 or may be pulled by the computing device executing the particular application. For example, the translated portion of the telephone event data may be pushed by the TELCO API server 130 in a manner such that the translated portion of the telephone event data is received by the computing device executing the particular application in real-time or near real-time. As another example, the translated portion of the telephone event data may be pushed periodically by the TELCO API server 130 in a manner such that the translated portion of the telephone event data is received by the computing device executing the particular application every minute, every thirty (30) minutes, every hour, every day, etc. As another example, the translated portion of the telephone event data may be pulled by the computing device executing the particular application in a manner such that the translated portion of the telephone event data is only received when requested by the computing device executing the particular application.

The translated portion of the event data received by the computing device may be, for example, displayed on a display screen of the computing device within the particular application.

In an embodiment, the particular application may not have memory storage for the translated portion of the event data. The TELCO API server 130 may determine that the particular application does not have memory storage for the translated portion of the event data. This may be determined, for example, during the configuration process. When it is determined that the particular application does not have memory storage for the telephone event data, the translated portion of the telephone event data may be associated with a telephone event data identification. The translated portion of the telephone event data may be stored in memory of the TELCO API server 130 in associated with the telephone event data identification. The TELCO API server 130 may send, via the communication module and to the computing device executing the particular application, the telephone event data identification. The TELCO API server 130 may receive a request for the telephone event data from the computing device executing the particular application, the request including the telephone event data identification. The TELCO API server 130 may obtain the stored telephone event data using the telephone event data identification and may send the telephone event data to the computing device executing the particular application such that the telephone event data may be viewed by a user of the computing device.

Figure 7:
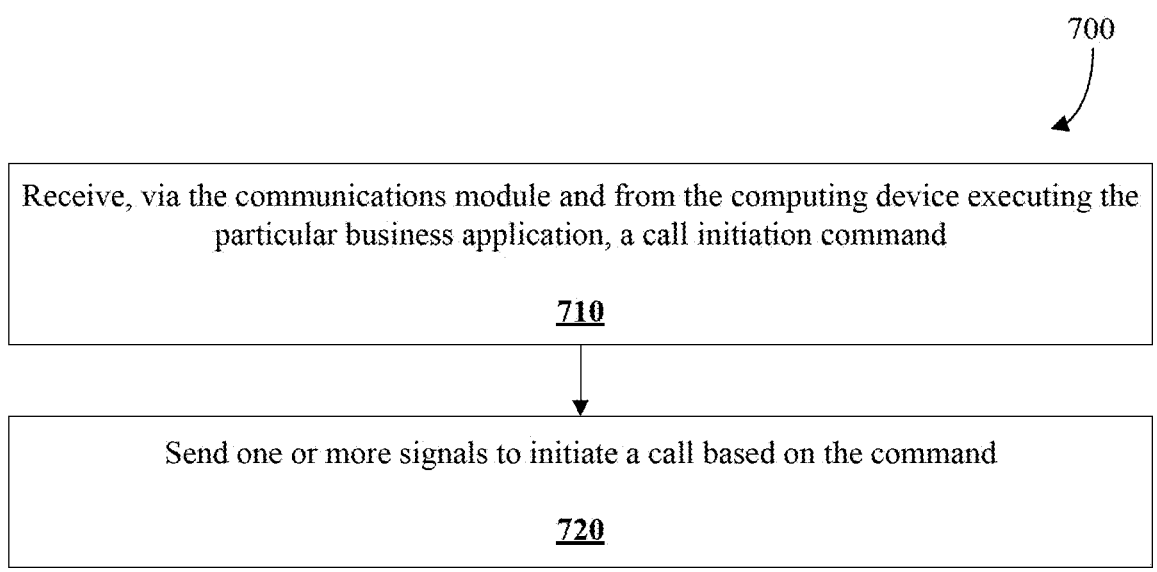
FIG. 7 is a flowchart showing operations performed by a server in initiating a call according to an embodiment.

As mentioned, the TELCO API server 130 may be configured to initiate call events when requested from the computing device 110. FIG. 7 is a flowchart showing operations performed by the TELCO API server 130 in initiating call events according to an embodiment. The operations may be included in a method 700 which may be performed by the TELCO API server 130. For example, computer-executable instructions stored in memory of the TELCO API server 130 may, when executed by a processor of the TELCO API server 130, configure the TELCO API server 130 to perform the method 700 or a portion thereof.

The method begins when the TELCO API server 130 receives, via the communications module and from the computing device executing the particular application, a call initiation command (step 710). The call initiation command may be in a format associated with the particular application. The call initiation command includes the telephone number of the party calling ("User A"), the telephone number of the party to be called ("User B") and may indicate a time for the call. It will be appreciated that in another embodiment, the TELCO API server 130 may identify the telephone number of the calling party based on data included with the received request. User A is assumed to be associated with mobile device 120 described above.

The TELCO API server 130 sends one or more signals to initiate a call based on the command (step 720). The one or more signals may be a first signal to initiate a call with User A via the mobile device 120 and a second signal to initiate a call with User B via a User B device.

Figure 8:
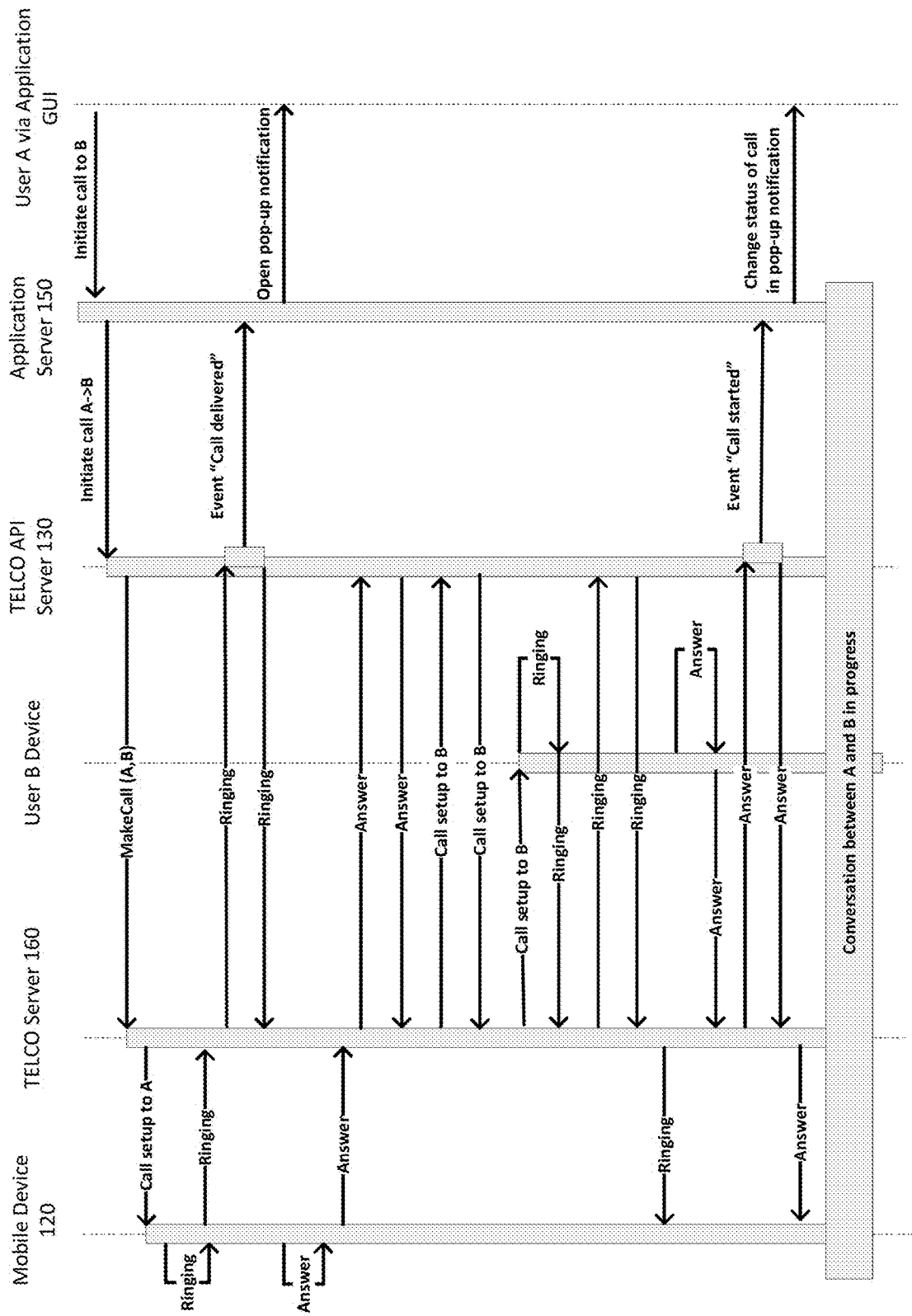
FIG. 8 is a sequence diagram illustrating an example call initiation command according to an embodiment.

A sequence diagram illustrating an example call initiation command is shown in FIG. 8. User A initiates a call to User B via a graphical user interface associated with the application executing on the computing device 110. The application server 150 receives the request and communicates that request to the TELCO API server 130. The TELCO API server 130 sends a signal to the TELCO server 160 to initiate the call from User A to User B. In response, the TELCO server 160 sends a signal to initiate the call with User A. This causes the mobile device 120 to ring. The signal may also cause the display of the mobile device 120 to display the telephone number of User B as a caller ID.

Telephone event data indicating a ring call state is sent from the TELCO server 160 to the TELCO API server 130. The telephone event data may be translated to a format compliant with the application using the above-described methods and sent to the application, the telephone event data indicating that the call was delivered. This may cause the application to display a notification on the computing device 110 indicating that the call was delivered.

User A answers the call using the mobile device 120. Telephone event data indicating an answered call state is sent from the TELCO server 160 to the TELCO API server 130.

The TELCO API server 130 confirms the answered call state and in response sends a signal to initiate the call to User B. In response, the TELCO server 160 sends a signal to initiate the call with User B. This causes the mobile device of User B to ring. The signal may also cause the display of the mobile device of User B to display the telephone number of User A as a caller ID.

Telephone event data indicating a ring call state is sent from the TELCO server 160 to the TELCO API server 130. A signal may be sent from the TELCO server 160 to the mobile device 120 and as such an audible ringing may be heard by User A indicating that the call is ringing on the mobile device of User B.

User B answers the call using their mobile device. Telephone event data indicating an answered call state is sent from the TELCO server 160 to the TELCO API server 130.

The TELCO API server 130 sends a signal indicating a call started state to the particular application, the signal being sent in the format compliant with the particular application. This may cause the application to update the displayed notification on the computing device 110 to indicate that the call has been started. The call is thus initiated.

Figure 9:
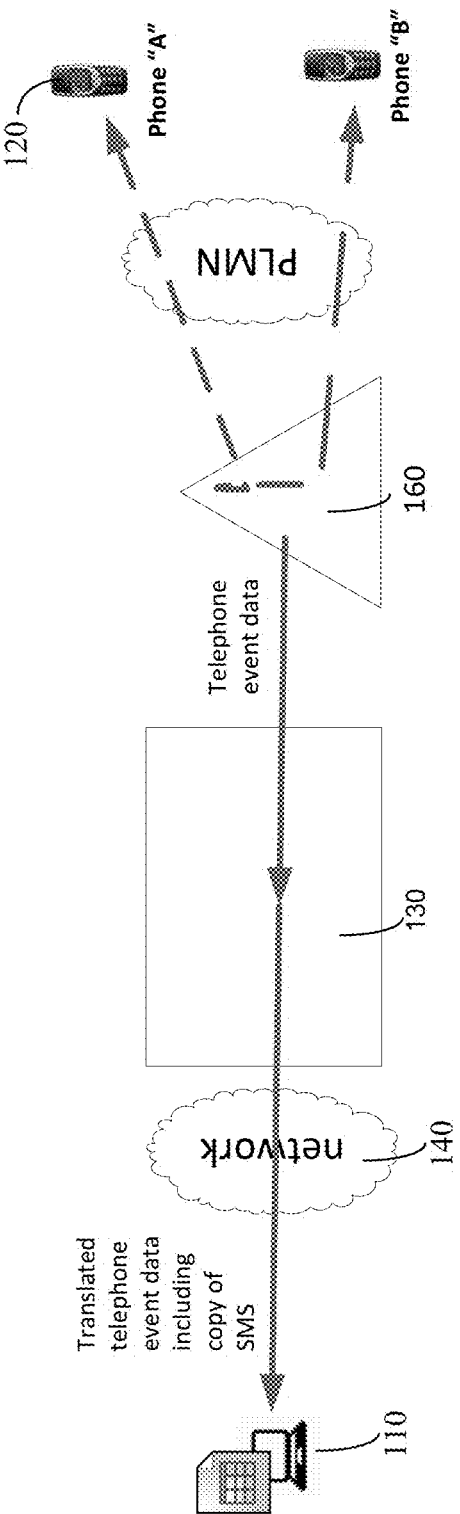
FIG. 9 is a flow diagram illustrating an example of providing telephone event data according to an embodiment.

As mentioned, the telephone event data may include short message service (SMS) messages. An example flow diagram of the system 100 providing telephone event data is shown in FIG. 9. In the example, an SMS message is exchanged between the mobile device 120 (User A) and another mobile device (User B) via the TELCO server 160 and the associated PLMN. The TELCO server 160 recognizes that the phone number associated with mobile device 120 (User A) has subscribed to the TELCO API server 130 and as such telephone event data including data associated with the SMS message is sent to the TELCO API server 130. The TELCO API server 160 translates the telephone event data to a format compliant with the business application executing on computing device 110 in a manner similar to that described above, and the translated telephone event data is provided to the application executing on the computing device 110. In this manner, SMS messages may be logged by the application executing on the computing device 110 without user intervention. Further, SMS messages sent and received from the mobile device 120 may be monitored via the application executing on the computing device 110.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A system comprising:
a communications module;
a processor coupled to the communications module; and
a memory coupled to the processor, the memory storing processor-executable instructions which, when executed by the processor, configure the processor to:
receive, via the communications module and from a telco server, telephone event data;
translate at least a portion of the telephone event data into a format compliant with a particular application executing on a computing device;
determine that the particular application does not have memory storage for the translated portion of the telephone event data;
when it is determined that the particular application does not have memory storage for the telephone event data, associate the translated portion of the telephone event data with a telephone event data identification;
store the translated portion of the telephone event data in the memory in association with the telephone event data identification; and
send, via the communications module and to the computing device executing the particular application, the telephone event data identification.

2. The system of claim 1, wherein translating at least a portion of the telephone event data comprises:
identifying, based on a phone number associated with the received telephone event data, the particular application;
obtaining a plug-in associated with the particular application from a plug-in library; and
translating the at least the portion of the telephone event data using the obtained plug-in.

3. The system of claim 1, wherein prior to sending the translated portion of the telephone event data, the processor-executable instructions, when executed by the processor, configure the processor to:
receive, via the communications module and from the computing device executing the particular application, a request for the telephone event data.

4. The system of claim 3, wherein the request for the telephone event data is received from the computing device executing the particular application periodically.

5. The system of claim 1, wherein the translated portion of the telephone event data is sent to the computing device executing the particular application periodically or in real-time.

6. The system of claim 1, wherein the processor-executable instructions, when executed by the processor, further configure the processor to:
receive, via the communications module and from the computing device executing the particular application, a request for the translated portion of the telephone event data, the request including the telephone event data identification;
retrieve the stored translated portion of the telephone event data based on the telephone event data identification; and
send, via the communications module and to the computing device executing the particular application, the translated portion of the telephone event data.

7. The system of claim 1, wherein the processor-executable instructions, when executed by the processor, further configure the processor to:
receive, via the communications module and from an administrator computing device, configuration data identifying a telephone number and the particular application.

8. The system of claim 1, wherein the processor-executable instructions, when executed by the processor, further configure the processor to:
select the portion of the telephone event data to be translated based on the particular application.

9. The system of claim 1, wherein the telephone event data includes at least one of telephone call events, telephone call logs, telephone conversation recordings, telephone voicemail recordings, short message service messages or telephone location data.

10. The system of claim 9, wherein the processor-executable instructions, when executed by the processor, further configure the processor to:
receive, via the communications module and from the computing device executing the particular application, a call initiation command;
sending, via the communications module and to the telco server, a signal to initiate a call based on the call initiation command.

11. A computer-implemented method comprising:
receiving, via a communications module and from a telco server, telephone event data;
translating at least a portion of the telephone event data into a format compliant with a particular application executing on a computing device;
determining that the particular application does not have memory storage for the translated portion of the telephone event data;
when it is determined that the particular application does not have memory storage for the telephone event data, associating the translated portion of the telephone event data with a telephone event data identification;
storing the translated portion of the telephone event data in the memory in association with the telephone event data identification; and
sending, via the communications module and to the computing device executing the particular application, the telephone event data identification.

12. The computer-implemented method of claim 11, wherein translating at least a portion of the telephone event data comprises:
identifying, based on a phone number associated with the received telephone event data, the particular application;
obtaining a plug-in associated with the particular application from a plug-in library; and
translating the at least the portion of the telephone event data using the obtained plug-in.

13. The computer-implemented method of claim 11, further comprising:
receiving, via the communications module and from the computing device executing the particular application, a request for the telephone event data.

14. The computer-implemented method of claim 13, wherein the request for the telephone event data is received from the computing device executing the particular application periodically or in real-time.

15. The computer-implemented method of claim 11, further comprising:

periodically sending the translated portion of the telephone event data to the computing device executing the particular application.

16. The computer-implemented method of claim 11, further comprising:
receiving, via the communications module and from the computing device executing the particular application, a request for the translated portion of the telephone event data, the request including the telephone event data identification;
retrieving the stored translated portion of the telephone event data based on the telephone event data identification; and
sending, via the communications module and to the computing device executing the particular application, the translated portion of the telephone event data.

17. The computer-implemented method of claim 11, further comprising:
selecting the portion of the telephone event data to be translated based on the particular application.

18. A non-transitory computer-readable storage medium storing instructions that, when executed by a processor of a computer system cause the computer system to:
receive, via a communications module and from a telco server, telephone event data;
translate at least a portion of the telephone event data into a format compliant with a particular application executing on a computing device;
determine that the particular application does not have memory storage for the translated portion of the telephone event data;
when it is determined that the particular application does not have memory storage for the telephone event data, associate the translated portion of the telephone event data with a telephone event data identification;
store the translated portion of the telephone event data in the memory in association with the telephone event data identification; and
send, via the communications module and to the computing device executing the particular application, the telephone event data identification.

* * * * *